Nov. 30, 1948.  T. MUNGALL, SR  2,455,134
SYNCHRONOUS ELECTRIC MOTOR
Filed July 13, 1946

INVENTOR.
THOMAS MUNGALL, SR.
BY
Morton S Brockman

Patented Nov. 30, 1948

2,455,134

UNITED STATES PATENT OFFICE 2,455,134

SYNCHRONOUS ELECTRIC MOTOR

Thomas Mungall, Sr., Cleveland, Ohio, assignor of one-half to George L. Becker, Cleveland, Ohio Application July 13, 1946, Serial No. 683,316

4 Claims. (Cl. 172—278)

1

This invention relates to alternating current electric motors of the type adaptable for use with clocks and relates more particularly to the armatures thereof.

Conducive to a clearer understanding of this invention it should be pointed out here that motors of this type are single phase and are often referred to as synchronous hysteresis motors. They are used in great numbers and hence are mass produced. It is, therefore, desirable to make such motors economically and simply with uniform operating characteristics. It is also desirable that they withstand relatively rough handling and still not lose their basic functional characteristic or value. Such motors should be small, compact, light in weight and operate with a high degree of efficiency.

It should also be pointed out here that in the past, efforts have been made with some degree of success to provide the synchronous clock motors with permanently magnetized armatures or rotors. This was done by perforating, denting, slotting, or otherwise distorting or mutilating the armature at points where magnetic poles were desired. The object and effect sought to be obtained thereby was to increase torque when the motor was in operation. In some instances the objects sought were obtained, however, the physical distortion and mutilation of the armature caused disadvantages and presented obstacles which reduced the efficiency of the motor and further restricted its use.

It is therefore the primary object of this invention to produce a motor of the type stated out of standard or readily obtainable elements and out of simple stamped metal parts which may be quickly assembled by machine or by inexpensive unskilled labor.

Another object of the invention is to construct such motor with a field, the opposite pole pieces of which co-operate and act on the motor armature with a minimum loss of magnetic flux.

A further object is to position the co-acting pole pieces of the motor field so that the armature is magnetically balanced between opposite inner and outer poles, and so that inner and outer surfaces of the armature are simultaneously acted upon.

These and other objects of the invention will become apparent from a reading of the following specification and claims, together with the accompanying drawing, wherein like parts are referred to and indicated by like reference characters, and wherein:

Figure 1 is a plan view of a synchronous hys-

2 teresis motor made in accordance with this invention and with parts thereof broken away to show construction;

Figure 1:
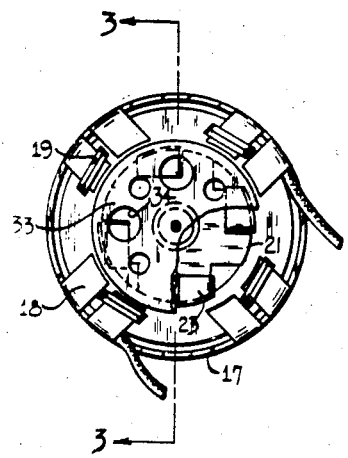

Referring to the first sheet of the drawing there is shown a synchronous motor having an outer combination field piece and frame formed of a rear end disk or plate 11 and a side band 17. These are made of magnetizable material and are securely fastened together at abutting edges. A soft iron core 16 having narrowed front and rear or constricted portions 13 is mounted inside the band 17 and firmly fastened to the disk 11 at the central opening 12 thereof.

A field coil 26 formed of several windings of suitable electro-magnet wire is mounted on the disk 11 and around the central core 16 and inside the band 17. The coil is wound to consume about two watts of current per hour. The two ends of the wire coil are less exposed for connection with alternating electric current. The coil 26 is covered at the front end with a cardboard ring 27.

The core 16 has an axial hole 14 therethrough which rotatably receives the hereinafter described armature rotor spindle 35 and a suitable lubricant therefor.

The band 17 has pole pieces 18 projecting forward and inward from the peripheral side portion thereof. These pieces 18 are referred to herein as the outer pole pieces and are arranged in symmetrical fashion and in pairs as shown in the Figure 2. The inner ends of the pole pieces 18 are flat and partially cover the front end of the coil 26. Each pole 18 has an arcuate inner edge and is concentric with the core axis.

Shading coils or rings 19 are mounted on one pole 18 of each pair for improving the self-starting character of the motor. These shading coils 19 are simply small sections of copper or other non-magnetizable metal which causes the magnetic flux of the particular pole on which it is mounted to lag as compared with the flux of the unshaded pole 18.

The inner field piece 21 is also made of magnetizable metal and is securely mounted on the front recessed portion 13 of the core 16, at its central opening 24.

The field piece 21 also has pairs of pole portions 22 thereon which partially cover the front end of the coil 26. The outer edges of the pole 22 are arcuate and concentric with the core axis. The poles 22 are on a plane with the pole 18 and the respective arcuate edges thereof are spaced slightly and sufficient to form an air space through which the hereinafter described armatures may freely move.

One pole 22 of each pair of poles is similarly shaded by means of the shading rings or coils 23. The front or inner field piece 21 is so mounted on the core 16 with respect to the outer field piece 17 that they are alternately arranged and a shaded pole 22 is proximate, but not in radial alinement with an unshaded pole 18.

It should be here noted that the polarity of the pairs of poles 18 and 22 are alternately changed with the flow of current passing through the coil 26. At a given instant the poles 18 may be polarized north or positive and the poles 22 polarized south or negative. When such motor is connected to a conventional sixty cycle alternating current, the polarity of both sets of poles change sixty times per second.

It should also be noted that the flat outer pole pieces 18 are joined to the peripheral outer portion 17 by gently curved parts which conduct the magnetic flux from the rear of the coil 16 to the front thereof with minimum loss of magnetic effect and without change of polarity. There are no sharp angles or abrupt terminals or ends which dissipate essential magnetic flux. The magnetic flux generated or created by this motor is therefore concentrated in the relatively narrow circular air space between the inner and outer arcuate edges of the poles 18 and 22, respectively.

Figure 2:
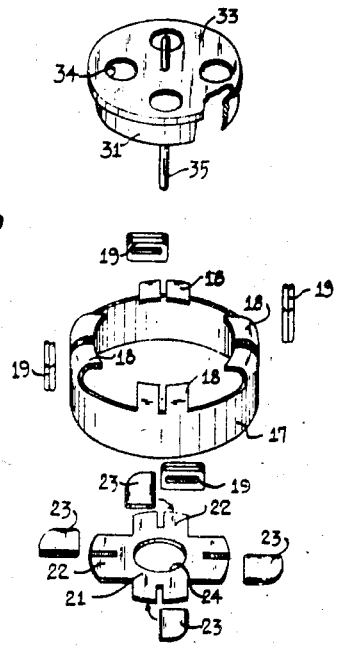
Figure 2 is an exploded view of the motor shown in the Figure 1.

The rotor of the motor is clearly shown in the Figure 2. It consists of a spindle 35 of suitable material which is freely and smoothly rotatable in the core 16. Attached to the spindle is a disk or plate 35 which is evenly perforated as indicated by the character 34 to reduce its weight. This may be made of aluminum or other suitable light weight non-magnetizable material. The plate has a small flange on one side thereof which engages the armature 31. The perforation of the plate facilitates stroboscopic analysis of the rotor in operation and also facilitates making adjustment for improving the dynamic balance of the rotor.

The armature 31 is an endless metal band having a width substantially greater than its thickness. It is made of high grade magnetizable steel having a high hysteresis coefficient and one which retains its magnetism and its pre-determined fixed polarity. It has a small bead around its forward edge which is firmly and rigidly held by the flange of the plate 33.

Figure 3:
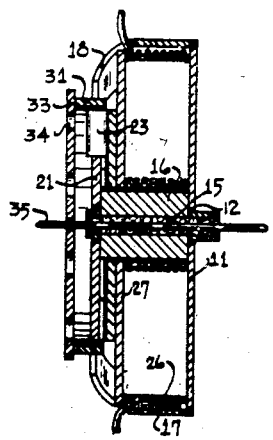
Figure 3 is a cross sectional view of the assembled motor shown in the Figure 1, and taken along the line 3—3 thereof.
Figure 4:
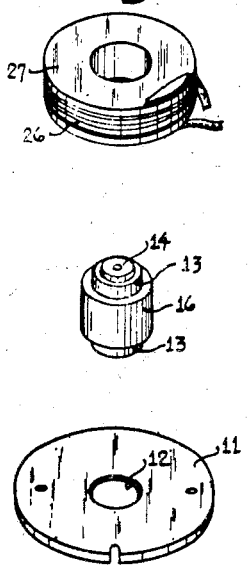
Figure 4 is a perspective view of the armature used in the motor.
Figure 4:
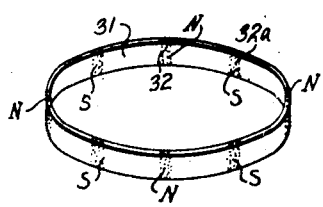

The rotor is mounted on the field as shown in the Figure 3 with the armature 31 concentric with the axis of the core 16 and intermediate the arcuate edges of the flat poles 18 and 22.

The armature 31 is heat treated, hardened and permanently magnetized in spots so that it has fixed spaced geographical poles all around it. These permanent hardened and polarized spots are not visible to the eye and are spaced to coincide with the pole pieces 18 and 22 from which it reacts and moves in accordance with the direction of flow of current in the coil 16, the location of the shaded poles 18 and 22 acts as an air space between the inner and outer sets of poles. It is also affected by other minor factors which in this instance may be disregarded for the sake of simplicity and clarity.

The method of heat treating, hardening and magnetizing the spaced points on the armature to create the invisible magnetically polarized spots is disclosed in the co-pending divisional application Serial No. 10,328, filed February 24, 1948.

Each of the hardened sections 32 and 32a of the armature band 31 about the length of the width of a single pole 18 or 22 is magnetized permanently to have either north or south polarity. The poles are alternately spaced and do not change polarity as do the poles 18 and 20. When the motor is at rest, each such section finds its static position between and adjacent unshaded poles 18 and 22. Residual magnetism in the poles 18 and 20 assists somewhat in causing the permanently magnetized spots 32 and 32a to find their static positions when the electric current is shut off.

The relative positions of the shaded and unshaded poles 18 and 22 determine the direction in which the armature rotates. The size of the air gaps between the unshaded poles determine the rotation speed of the armature and the size of the shading coils 19 and 23 determines the torque and self-starting character of the armature. The degree of flux lag or choke may be increased or decreased by decreasing or increasing respectively the size of the shading coils.

Among the many advantages that this synchronous motor has over prior art synchronous motors is the outstanding advantage of having the magnetic flux acting on both the inner and outer surfaces of the band armature 31. The inner and outer surfaces of the north and south polarized spots 32 and 32a respectively are effected simultaneously by the magnetic poles 18 and 22. None of the flux of the armature is lost, dissipated, or distorted. From a practical standpoint this permits of the use of a heavier coil wire which in turn makes a more durable and substantial motor.

Having thus disclosed the inventions, the motor per se and the process of making the armature thereof, in their preferred forms, it should be understood that there may be other forms or modifications of the invention which also come within the scope of the following claims. For example, the motor illustrated has four pairs each of inner and outer field poles, correspondingly the jig 40 has eight slots and the fixture 50 has four permanent magnets. Each of these elements may be increased in number without deviating from the invention. It should be further understood that no limitations on this patent are intended except those lawfully imposed thereon by the scope of the appended claims.

I claim:

1. A synchronous electric motor, comprising in combination, a magnetic field member including spaced inner and outer pole pieces having alternately changing polarity, the said pole pieces having facing and spaced edges, and an armature comprising a band of magnetic material rotatable between the said spaced edges, the said armature having hardened and permanent magnetically polarized spots therearound correlated with the said polarized edges.

2. A synchronous electric motor, comprising in combination, a magnetic field member including a core having front and rear ends, a coil of wire on the core between the said ends, a magnetizable metallic case mounted on the rear end of the said core encasing the rear end and the peripheral portion of the said coil, the said metallic case having a plurality of inwardly curved outer pole pieces partially covering the front end of the said coil, the said field member also including inner pole piece mounted on the front end of the said core and covering the front end of the said coil and being concentric with the aforesaid outer pole pieces, the said inner and outer pole pieces having facing and spaced edges of alternately changing polarity; and an armature comprising a band of magnetic material rotatable between the said spaced edges, the said armature having hardened and permanent magnetically polarized spots therearound correlated with the said polarized edges.

3. A synchronous electric motor, comprising in combination, a magnetic field member including a core having front and rear ends, a coil of wire on the core between the said ends, a magnetizable metallic case mounted on the rear end of the said core encasing the rear end and the peripheral portion of the said coil, the said metallic case having a plurality of inwardly curved outer pole pieces forming spaced pairs of north and south poles and partially covering the front end of the said coil, the said field member also including inner pole piece forming spaced pairs of north and south poles and mounted on the front end of the said core and covering the front end of the said coil and being concentric with the aforesaid outer pole pieces, the said inner and outer north and south poles having facing and spaced edges of alternately changing polarity, the said pairs of north and south poles of the inner and outer pieces respectively being obliquely positioned radially and the normal south poles thereof having non-magnetic shading rings thereon, and an armature comprising a band of magnetic material rotatable between the said spaced edges, the said armature having hardened and permanent magnetically polarized spots therearound correlated with the said polarized edges.

4. A synchronous electric motor, comprising in combination, a magnetic field member including spaced inner and outer pole pieces having alternately changing polarity, the said pole pieces having spaced edges, and an armature comprising a band of magnetic material rotatable between the said spaced edges, the said armature having permanent magnetic poles therearound correlated with the said polarized spaced edges, the material between the poles of the said armature being relatively soft.

THOMAS MUNGALL, Sr.

REFERENCES CITED

The following references are of record in the file of this patent:

UNITED STATES PATENTS

| Number | Name | Date |
| --- | --- | --- |
| 1,985,091 | Haigis | Dec. 18, 1934 |
| 2,019,683 | Kohlhagen | Nov. 5, 1935 |
| 2,071,536 | Kalin | Feb. 23, 1937 |
| 2,234,420 | Traeger | Mar. 11, 1941 |
| 2,237,960 | Hansen et al. | Apr. 8, 1941 |
| 2,349,620 | Hansen et al. | May 23, 1944 |

FOREIGN PATENTS

| Number | Country | Date |
| --- | --- | --- |
| 387,160 | Great Britain | Feb. 2, 1933 |